United States Patent [19]
Tejada

[11] 3,845,492
[45] Oct. 29, 1974

[54] METHODS AND APPARATUS FOR RECORDING WELL LOGGING MEASUREMENTS

[75] Inventor: Roberto Armando Tejada, Talara, Peru

[73] Assignee: Schlumberger Technology Corporation, New York, N.Y.

[22] Filed: July 12, 1973

[21] Appl. No.: 378,735

[52] U.S. Cl.......... 346/33 WL, 33/314, 340/18 DC, 346/23, 346/45, 346/109
[51] Int. Cl. ............................................. G01d 9/38
[58] Field of Search .. 346/109, 108, 107 R, 33 WL, 346/45, 23, 1; 33/314, 313, 312; 353/11, 42; 340/24, 15.5 DS, 15.5 BH, 18 DC

[56] References Cited
UNITED STATES PATENTS

| | | | |
|---|---|---|---|
| 2,171,327 | 8/1939 | Anderson | 346/62 |
| 2,314,722 | 3/1943 | Maggin | 346/108 X |
| 2,930,668 | 3/1960 | Behrmann et al. | 346/8 |
| 3,228,281 | 1/1966 | Holt | 353/11 X |

*Primary Examiner*—Joseph W. Hartary
*Attorney, Agent, or Firm*—Ernest R. Archambeau, Jr.; William R. Sherman; Stewart F. Moore

[57] ABSTRACT

According to the present invention, arrow-plot logs or dipmeter logs comprised of distinctive vector or arrow shaped indicia representative of well logging data or signals are produced by a galvanometer type recorder. A light beam prior to being reflected from the galvanometer mirror toward the recording medium is passed through a selectively oriented mask such that the resulting light beam has a vector or arrow shaped cross section. The orientation of the mask, and thus the orientation of the vector shaped light beam impinging on the recording medium is in response to one well logging signal. Similarly, the rotation of the galvanometer mirror, and thus the location of the vector shaped light beam on the recording medium, is in response to another well logging signal.

27 Claims, 7 Drawing Figures

METHODS AND APPARATUS FOR RECORDING WELL LOGGING MEASUREMENTS

BACKGROUND OF THE INVENTION

In producing well logging measurements for purposes of recording, a logging tool containing one or more exploring devices is lowered into a borehole drilled into the earth for measuring the various physical properties of the wellbore and of the subsurface earth formations adjacent the borehole. Such measurements are of considerable value in determining the presence and depth of hydrocarbon bearing zones that may exist in the subsurface earth formations. There are presently in use a variety of galvanometer recorders capable of providing satisfactory well logs or visual recordings representative of most types of data derived from a borehole. Some of these galvanometer recorders are specifically useful for recording a large number of different well logging data signals at one time. Examples of such recorders are described in: (1) U.S. Pat. No. 3,449,755 which issued to G. L. Samodai, et al. on June 10, 1969; (2) U.S. Pat. No. 3,488,661 which issued to D. R. Tanguy on Jan. 6, 1970; and (3) U.S. Pat. No. 3,634,865 which issued to C. O. Schafer on Jan. 11, 1972. Such galvanometer recorders typically produce curves on a recording medium such as film by deflecting a beam of light with the galvanometer mirror in response to amplitude changes in the signal to be recorded. The recording medium moves in a direction perpendicular to the deflection of the light beam such that a continuous curve representative of changes in the signal amplitude is produced on the recording medium. When such recorders are used for well logging, the movement of the recording medium is typically coordinated with the depth of the borehole from which the recorded signal is derived such that changes in the signal amplitude may be observed as a function of depth. In addition, a particularly suitable CRT recorder for recording a multiplicity of well logging measurements is described in copending application Ser. No. 15,790 filed by J. W. Elliott on Mar. 2, 1970. However, not withstanding the versatility of the recorders described in the above-mentioned patents and the application, there are certain types of well logging data which are most advantageously displayed on a log or recording in a manner which requires even more specific methods and apparatus for generating the desired visual display.

For example, two types of data which require unusual methods and apparatus for the most advantageous display are those used for providing information concerning: (1) the magnitude and direction of the inclination of a borehole relative to true vertical; and (2) the magnitude and direction of the dip or inclination of earth formations surrounding a borehole. It is of great practical importance to have information concerning the position and orientation of the borehole along its length with respect to the starting point thereof on the earth's surface. This information is useful, for example, to insure that the borehole remains within a predetermined land area measured at the surface. It is also of great practical importance to have information concerning the position of subsurface earth formations in areas possibly containing or known to contain oil and gas bearing formations. This information is useful in that, among other things, it may aid in locating sizeable deposits of oil and gas trapped by faults or subsurface layers of slipped strata. It is also desirable since knowledge of subsurface faults or slipped strata may allow an oil field to be developed most efficiently. For example, the simple placement of wells can radically affect both the maximum rate of production and the ultimate recovery from a single oil reservoir.

To present the two signals representative of magnitude and direction of the inclination of a borehole or the dip or inclination of earth formations several techniques have been used heretofore. In very early techniques, for example, the amount of inclination and the direction of inclination were simply tabulated along with the corresponding depth levels from which the information was derived. In another early technique, two curves were produced on a recording medium. One of the curves would represent the magnitude of the inclination, and the other curve would represent the direction or angular value of the inclination. Correlating such a combination of curves has proven difficult and not generally acceptable in the industry. Consequently, the most convenient technique for displaying inclination direction and magnitude at a particular depth level has been found to be by way of "vectors" or "arrows" located and oriented on the recording medium in response to the two signals to provide the so-called arrow-plot logs. In the use of such logs, the magnitude of the inclination is typically represented by the horizontal location of the vector on the recording medium. For example, a base line or preselected horizontal location on the recording medium is representative of zero inclination. Thus, the farther away from the base line the vector is located, the greater the magnitude of the inclination. If the inclination is zero, there is, of course, no direction of inclination. However, assuming some inclination exists, the direction or azimuth of such inclination is typically represented by the orientation of the vector on the recording medium. For example, if the azimuth of the inclination is North, the vector will typically point to the top of the log; if it is East, the vector points to the right of the log, etc. in accordance with a typical compass presentation.

Arrow plot logs providing such information concerning the inclination of borehole or formations have typically been provided manually from tabulated data. Although, in some instances the logs have been produced by an "X" – "Y" plotter. However, such methods are typically time-consuming and costly.

Therefore, it is an object of this invention to provide new and unique apparatus for generating logs comprised of arrows or vectors representative of data corresponding to the magnitude and direction of the inclination of a borehole or the magnitude and direction of the inclination of earth formations adjacent a borehole.

SUMMARY OF THE INVENTION

The system of the present invention provides apparatus for recording data or signals as vectors or arrows on a recording medium. An energy beam, such as a light beam, is passed through a vector or arrow shaped mask or window such that the resulting light beam has a vector shaped cross section. The orientation of the vector shaped light beam is controlled by rotating the mask or window in response to one of the signals to be recorded. The invention also includes a shutter arrangement for "blanking" and "unblanking" or turning the light beam "off" and "on". In operation, the light beam is usually in the blanked or off condition and is unblanked or on only momentarily when a vector is to be produced. The apparatus of this invention also includes means for moving the light beam to a selected location on the recording medium in response to another one of the signals to be recorded. Movement of the light beam across the recording medium is preferably accomplished by a galvanometer mirror arrangement.

Since the light beam is preferably blanked or off when the galvanometer mirror moves in response to the signal, no image is produced as the mirror is being positioned. Thus, when the light beam is momentarily unblanked or turned on, a clear and distinct vector having the appropriate orientation is produced at the appropriate location.

Figure 1:
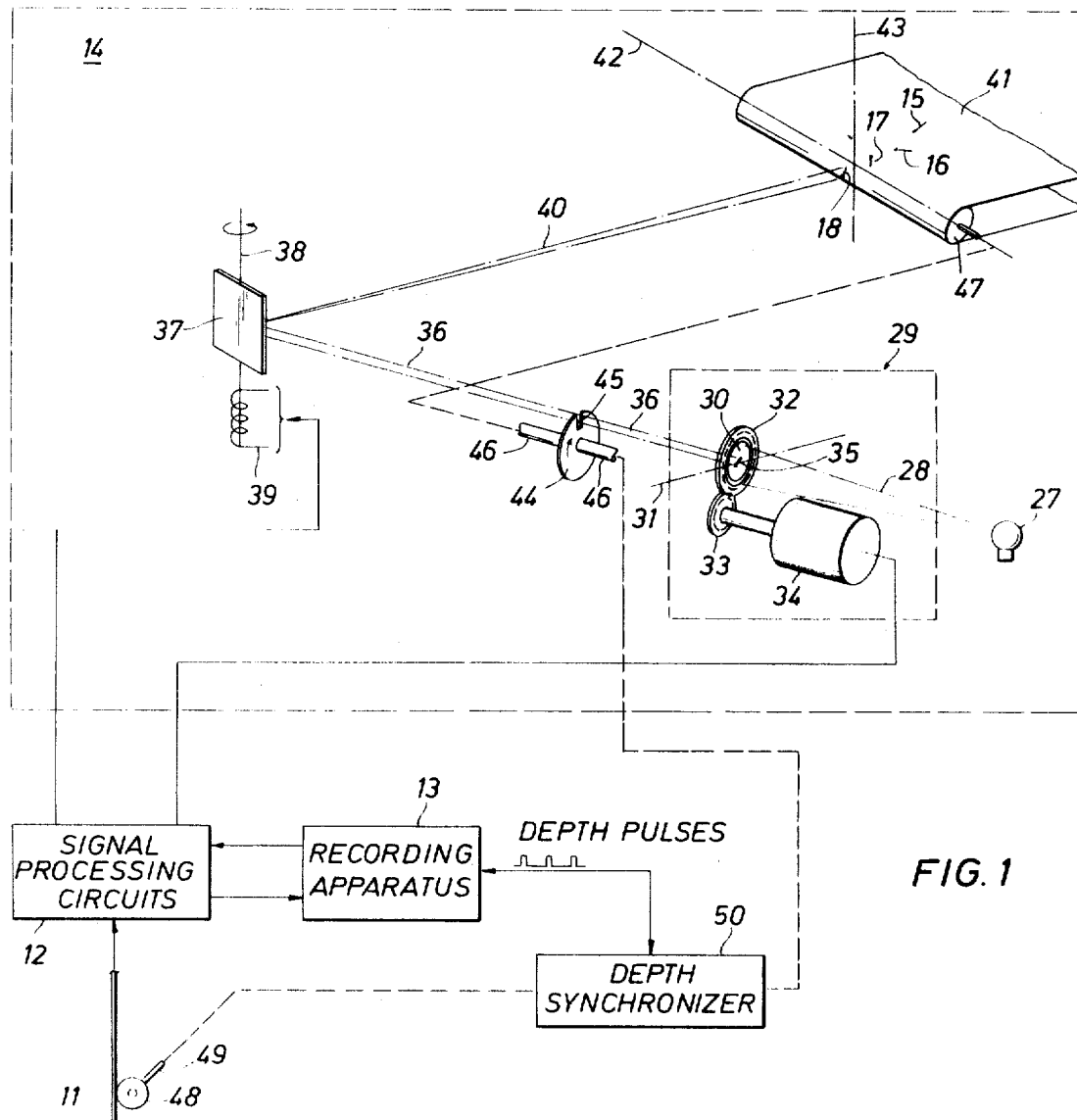
FIG. 1 is a diagrammatic illustration of apparatus according to the present invention for recording data derived from a well logging tool as vectors selectively located and oriented on a recording medium.

Now referring to FIG. 1, a diagrammatical representation of apparatus for obtaining and recording data such as formation inclination and azimuth or borehole inclination and azimuth as vectors on a recording medium such as film is shown. The horizontal location of the vectors on the recording medium and the direction that the vectors point are representative of the inclination magnitude and azimuth, respectively. Downhole investigating tool 9 is supported in borehole 10 by a typical multiconductor logging cable 11 which is raised and lowered by a typical winch (not shown). The various types of data obtained by investigating device 9 are transmitted to the surface of the earth by way of the conductors in multiconductor cable 11 where it is then applied to signal processing circuits 12. As was mentioned heretofore, there are at least two types of inclination and azimuth recordings which may be produced by the present apparatus. The type of recording produced is determinative of the circuitry necessary to be contained in the signal processing circuits 12. For example, if the investigating device 9 is for determining the inclination magnitude and azimuth of the borehole 10, signal processing circuits 12 may comprise simple conditioning circuits such as amplifiers. Data indicative of the borehole inclination magnitude is determined by an inclination detection unit contained in investigating device 9 and is then transmitted to the earth's surface where it is conditioned by the amplifiers and made available for use by the recorder of this invention. The inclination detection unit may typically comprise a pendulum cooperatively arranged with a potentiometer for providing an indication of the deviation between the longitudinal axis of the well tool and a vertical position as indicated by the pendulum. Similarly, data indicative of the direction of the inclination (azimuth), with respect to some reference point such as magnetic North, is determined by an azimuth indication unit also contained in investigating device 9 and is transmitted to the earth's surface where this data is also conditioned by one of the amplifiers and made available for use by the visual recorder of this invention. The azimuth indication unit typically includes a magnetic bar (compass) and a combination of potentiometers cooperatively arranged such that the direction of the inclination with respect to magnetic North is determined. A complete discussion of apparatus of the type just described may be found in U.S. Pat. No. 2,746,162. Other suitable techniques for determining the magnitude and azimuth of the inclination of the borehole which are suitable for use with the present invention are also presently available. Examples of these other techniques may be found in U.S. Pat. Nos. 3,699,510; 3,691,363; 3,137,077; 3,079,697 and 2,940,177.

Determining the magnitude and direction of the inclination of subsurface formations which are adjacent to the borehole 10 is typically much more complex than simply determining the magnitude and direction of the borehole inclination. Recordings or logs indicative of formation inclination magnitude and azimuth are commonly called dip meter logs. Processing of at least seven different measurement parameters is typically necessary if high quality dip meter logs or displays are to be produced. For example, U.S. Pat. No. 3,217,242 is typical of the technique for processing data and providing a dip meter display. In other instances, the necessary measurements would be sent to the surface and processed by a general-purpose computer such that data representative of the magnitude and direction of the subsurface inclination were produced from the many measurements. Then, this data would be tabulated and correlated with the depth from which they were derived. The tabulated and depth correlated data is then available for manually producing the dip meter logs or the data may be further processed and applied to a typical X – Y recorder for producing the log. A computer program suitable for processing these seven measurements and providing the corresponding magnitude and direction of inclination measurements is commercially available from IBM (International Business Machines). The program is entitled, "Dip Meter Log Processing", and is prepared for processing on the IBM/360 computer. The identification number of the program is H20-0016. The data provided by the computer program is also suitable for use with the vector recorder of the present invention.

Thus, it can be seen that the apparatus comprising the signal circuits 12 may vary from nothing more than two signal amplifiers to a complete general-purpose computer. However, regardless of the type of circuitry contained in signal processing circuits 12, these circuits will provide at least two distinct signals for generating each vector or arrow on a recording medium by the visual recording apparatus of this invention.

It should also be recognized that, although the recorder of the system of this invention may very well operate in "real time", it is certainly possible and may be desirable that applicable data be recorded on other suitable recording apparatus such as magnetic tapes, disks, etc., for use at a later time to generate the arrow-plot logs. For example, as shown in FIG. 1, a recording apparatus 13 is provided for receiving either raw data from the investigating apparatus 9 or processed data from signal processor 12. If processed data for producing the Arrow-Plot log is recorded by recording apparatus 13, then it is only necessary to play back the recorded vector data and corresponding depth information and transmit this information to a new and improved recorder 14 of the present invention by way of processor 12, for example, for producing each vector. However, if raw data from investigating device 9 is recorded at recorder 13, the recorded raw data must be processed by signal processor 12 and then the resulting two signals necessary for generating each vector are transmitted to the new and improved recorder 14 for display.

Figure 2:
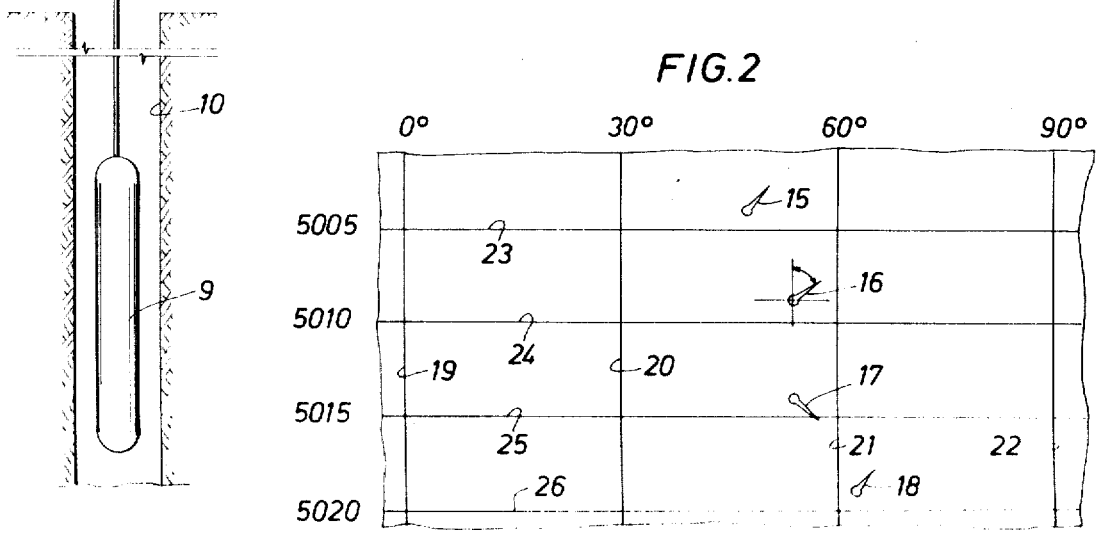
FIG. 2 is illustrative of a portion of a typical Arrow-Plot log produced by the new and improved apparatus of the present invention.

In any event, according to the present invention, the two signals provided by signal processing circuit 12 are then applied to a new and improved galvanometer type recorder 14 uniquely arranged to produce an arrow-plot log. FIG. 2 illustrates a sample of an arrow-plot log.

As shown in FIG. 2, in addition to vectors or arrows 15, 16, 17 and 18, the illustrated arrow-plot log also includes vertical or scale lines 19, 20, 21 and 22 and horizontal or depth lines 23, 24, 25 and 26. The vertical scale lines are representative of the magnitude of the inclination in degrees, and typically vary from 0° to 90°. The depth lines indicate increments of depth in the borehole 10 from which the data represented by the vector was derived. For example, depth lines 23, 24, 25 and 26 could represent increments of five feet at depth levels between 5005 and 5020 feet. Thus, in the example, it can be seen that vector 16 is representative of measurements taken at about 5008 feet, and that the inclination represented by the measurement has a magnitude of approximately 55° and an orientation of East-North-East or about 60° from magnetic North.

To produce vectors having a specific orientation and a specific location on a recording medium, recorder 14 includes an energy source 27 such as a light or maser source which projects a beam of energy 28 toward orienting apparatus 29. Orienting apparatus 29 comprises a disk 30 adapted for rotating around axis 31 and supported by orienting gear 32. The rotation of gear 32 is controlled by driving gear 33 which is in turn driven by driving source 34. Driving source 34 is typically a Selsyn motor arrangement or other servo mechanism which is responsive to one of the two output signals from signal processor 12. Disk 30, which is substantially opaque to energy produced by energy source 27, is constructed with a window 35. Window 35 may either be a cutout portion of disk 30 or a screen which is transparent to energy produced by energy source 27. It should be clear at this point that energy source 27 could be a light source, a maser source or any other source for producing a suitable energy beam. However, for purposes of explanation, energy source 27 will be hereinafter referred to as a light source, and energy beam 28 will hereinafter be referred to as a light beam. Therefore, light beam 28, which impinges on disk 30, is blocked except for beam 36 which is transmitted through disk 30 toward mirror 37 and has a vector, arrow or other distinct cross section. Thus, it can be seen that a light beam having a cross section in the form of a vector and angularly oriented in accordance with a signal from signal processor 13 will impinge on mirror 37. Mirror 37 which is adapted to rotate around axis 38 is typically a galvanometer type mirror, and the rotation around axis 38 is controlled by the magnitude of a signal applied to driving means 39. In the apparatus shown, driving means 39 is a coil which positions mirror 37 in response to one of the signals from signal processor 12. Although mirror 37 is shown driven by a coil, such illustration is only intended tO represent a typical technique of positioning mirror 37; and it is to be understood that any galvanometer mirror support or rotating means is suitable and may be used with the present invention. Vector or arrow shaped light beam 40 is then reflected from mirror 37 to a particular location on a horizontal axis of recording medium 41; which recording medium is, of course, sensitive to light beam 40. Axis 42 of recording medium 41 is hereinafter referred to as the horizontal axis, and axis 43 of recording medium 41 is hereinafter referred to as the vertical axis. The particular location along horizontal axis 42 at which light beam 40 impinges on recording medium 41 is, of course, dependent upon the angular orientation of galvanometer mirror 37. Therefore, it can be seen that a vector shaped image will be recorded on recording medium 41. As was discussed with respect to FIG. 2, the angular orientation of the vector or arrow is dependent upon one of the two signals provided by signal processing circuit 12 and is representative of direction of azimuth of the inclination. The location of the vector or arrow along horizontal axis 42 of recording medium 41 is dependent upon the other one of the two signals provided by signal processing circuits 12 and is representative of the magnitude of the inclination.

Since in normal operation, it is desirable that recorder 14 produce many successive vertically-displaced vectors or arrows on recording medium 41 as is illustrated at 15, 16, 17 and 18 of FIG. 2, a shutter or other blanking means is also provided such that each vector is clear and distinct without blurring or smearing. For example, referring again to FIG. 1, there is shown in the illustrated embodiment an opaque shutter disk 44 having one or more apertures such as aperture 45. Disk 44 rotates on shaft 46 such that the transmission of light beam 36 is completely blocked between disk 30 except when aperture 45 is in line with beam 36. As is also shown in FIG. 1, recording medium drive roller 47 is coupled to shaft 46 such that recording medium 41 travels in a direction perpendicular to the movement of beam 40 resulting from the angular movement of mirror 37. Thus, it can be seen that each time aperture 45 of shutter disk 44 rotates to a position which is in line with light beam 36, vector shaped light beam 40 impinges on recording medium 41 to produce an image of a vector. It can also be seen that since the rotation of disk 44 is coupled to drive roller 47, the vector produced on recording medium 41 each time aperture 45 rotates to a location in line with light beam 36 will be at a different vertical position. To control the vertical placement of the vectors on recording medium 41, a typical measuring wheel 48 is operatively engaged with cable 11 for rotating shaft 49 as a function of the movement of cable 11; and thus, the depth of the tool 9 in borehole 10. Shaft 49 is coupled to depth synchronizer 50 which may simply be a gearing arrangement to couple shaft 49 with shaft 46 of shutter disk 44, or synchronizer 50 could include a depth pulse generator for generating pulses as given incremental lengths of cable passing measuring wheel 48. If depth synchronizer 50 includes a depth pulse generator, the pulses from the pulse generator are typically applied to other apparatus contained in depth synchronizer 50 such that shaft 46 is rotated in response to logging tool 9 moving a specific increment through borehole 10. It should also be noted that depth synchronizer 50 is also connected to data recorder 13 such that all corresponding depth information can be recorded along with the borehole data. Thus, it can be seen that recording medium 41 is moved by drive roller 47 at a rate which varies with the rate of movement of logging tool 9 through the borehole 10; and accordingly, it will be appreciated that the movement of the recording medium 41 is effective for longitudinally or vertically displacing each successive vector or arrow which is representative of data produced from preselected depth intervals of borehole 10. Referring to FIG. 2, it will be recalled that each vector in that example was spaced a distance representative of about five feet.

Figure 3:
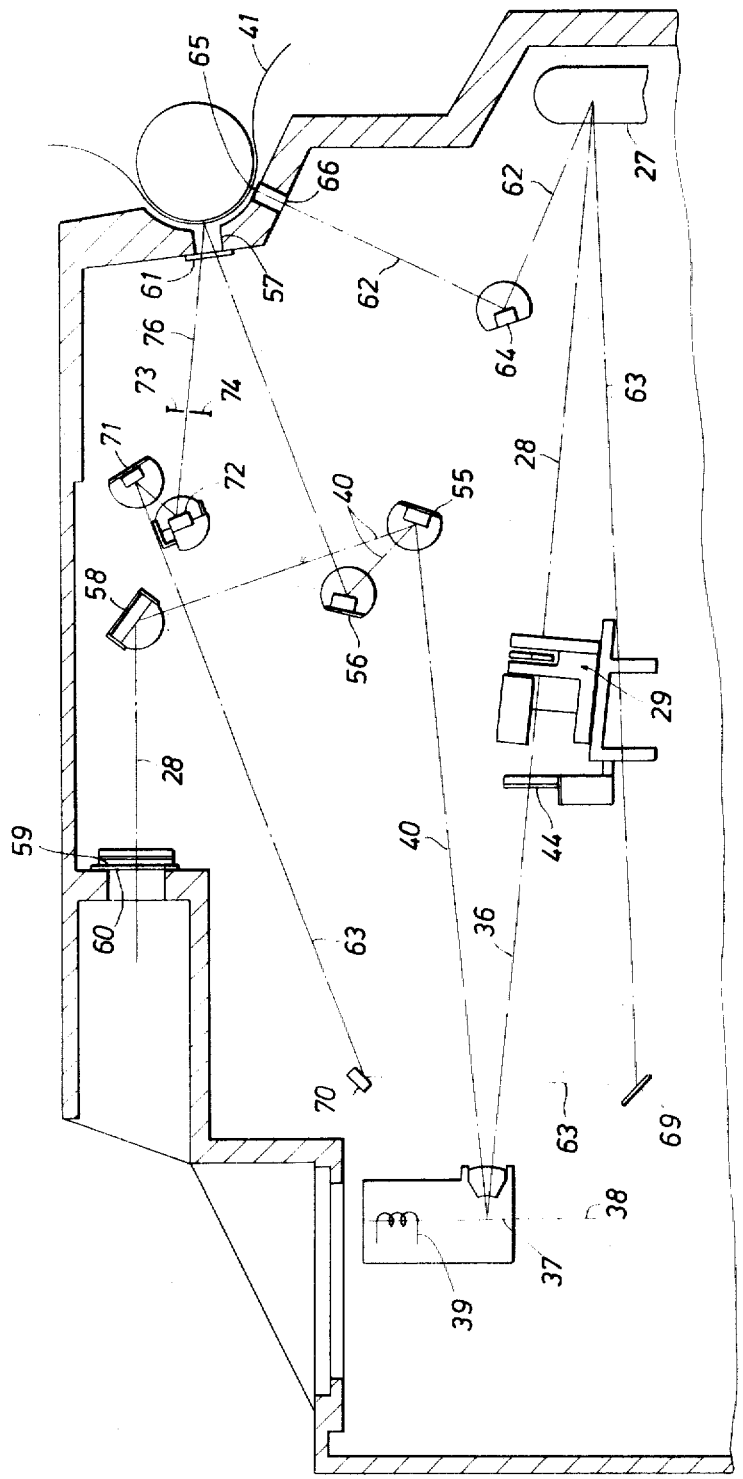
FIG. 3 is an elevational cross-sectioned view of a recorder according to one embodiment of the present invention for recording selectively located and selectively oriented vectors on a recording medium.
Figure 4:
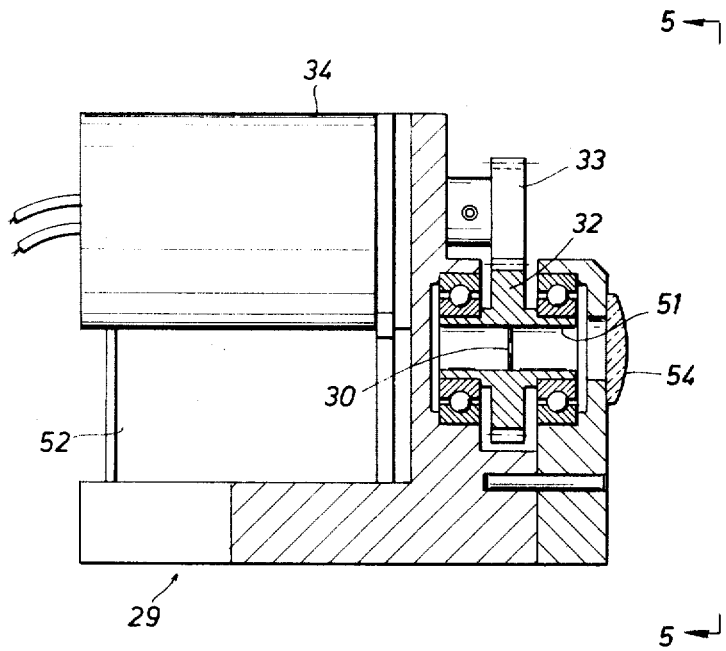
FIG. 4 is an enlarged partially cross-sectional elevation view of a portion of the apparatus of FIG. 3 for orienting the vector.
Figure 5:
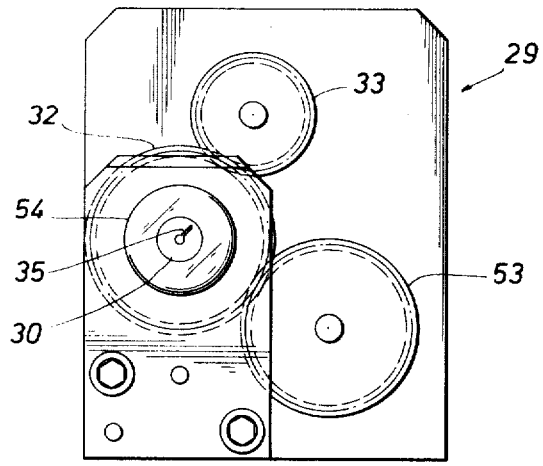
FIG. 5 is another enlarged elevation view of the orienting portion of the apparatus of FIG. 3.

FIG. 3 shows a detailed drawing of the recorder 14 of FIG. 1. In addition, other features of the recorder not discussed with respect to FIG. 1 are also illustrated and discussed. The same reference numbers are used in FIG. 3 for those components of the recorder that are the same as those described in FIG. 1. Referring now to FIG. 3, there is shown light source 27 which projects light beam 28 toward orientation apparatus 29. As shown in FIGS. 4 and 5, orientation apparatus 29 includes driving motor 34 which is connected to driving gear 33. Driving gear 33 is then used to rotate orientation gear 32 which is supported on hollow shaft 51 by bearings. Opaque disk 30 which contains vector shaped window 35 is mounted within hollow shaft 51. This, it can be seen that driving motor 34 directly controls the orientation of the vector shaped window 35 in disk 30. Also included in orientation apparatus 29 is potentiometer 52, the output of which is varied by rotation of potentiometer gear 53. As is clearly illustrated in FIG. 5, potentiometer gear 53 meshes with orientation gear 32; and therefore, potentiometer 52 may be connected to provide an output representative of the orientation of orientation gear 32. By connecting driving motor 34 and the output of potentiometer 52 in a manner readily understood by those familiar with servo mechanisms, it will be appreciated that the orientation of vector shaped light beam 36 can readily be varied in response to variations of an applied signal, such as one of the signals from signal processor 13 of FIG. 1. Also included in orientation apparatus 29 is lens 54 used to focus light beam 28 from light source 27 onto disk 30 for providing a sharp image to galvanometer mirror 37. Referring again to FIG. 3, there is shown shutter apparatus 44 which is used to blank or interrupt light beam 36 traveling between orientation apparatus 29 and galvanometer mirror 37 in the same manner as was discussed with respect to FIG. 1. It should be appreciated at this point that, although the described embodiment includes shutter apparatus 44, other means of interrupting or blanking the light beam could be used. For example, light source 27 could be turned on or flashed only when it is desirable that a vector or arrow be produced. That is, blanking and unblanking of the light beam includes turning the beam off and on. Galvanometer mirror 37 then reflects the vector shaped light beam 40 to mirror 55 which may be oriented in two positions. One of the two positions reflects the light beam toward fixed mirror 56 which, in turn, reflects light beam 40 through window 57 on to recording medium 41. When mirror 55 is in the other of the two positions, light beam 40 is reflected toward fixed mirror 58 which, in turn, reflects the light beam to viewing screen 59. Thus, it will be appreciated that by selectively positioning mirror 55, the image of a vector or arrow can either be recorded on recording medium 41 or observed at viewing screen 59. To avoid the possibility of outside light entering through viewing screen 59 and exposing recording medium 41, a polarizing screen or filter 60 is placed in front of viewing screen 59, and a second polarizing screen or filter 61 is positioned in front of window 57. The two polarizing filters 60 and 61 have their polarizing axis rotated 90° one from the other and, therefore, effectively block any outside light from reaching recording medium 41.

Figure 6:
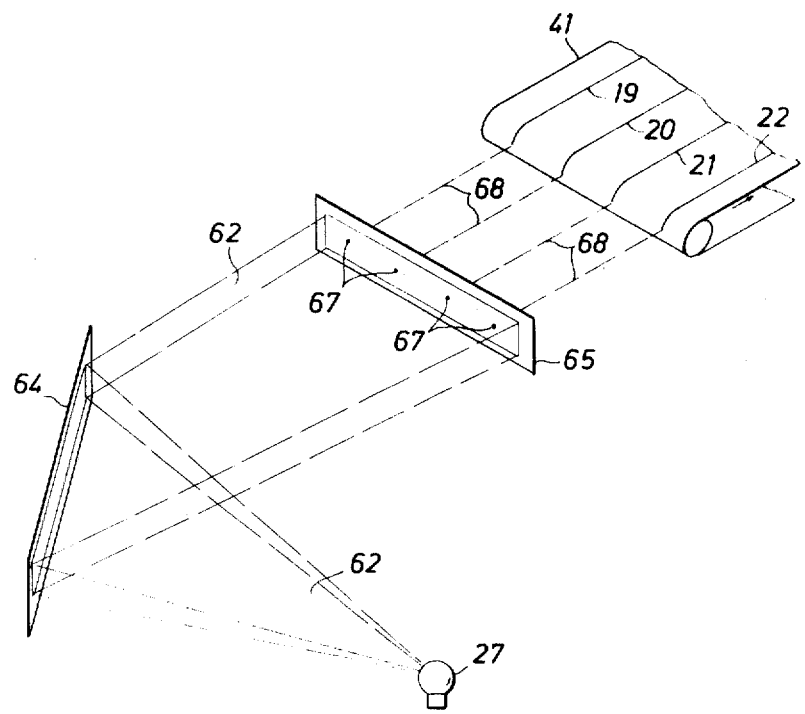
FIG. 6 Is a diagrammatic illustration of apparatus of the present invention for producing longitudinal or scale lines on a recording medium.

In addition to light beam 28, source 27 also provides light beams 62 and 63 which serve to generate longitudinal or scale lines and horizontal or depth lines respectively on recording medium 41. As shown in FIG. 3, and diagrammatically in FIG. 6, light beam 62 from light source 27 is used to provide scale lines 19, 20, 21 and 22 which run longitudinally on recording medium 41. To produce these scale lines, light beam 62 is reflected by mirror 64 through screen 65 and window 66 onto recording medium 41. Screen 65 is comprised of an opaque mask in which is drilled horizontally spaced holes 67. Thus, it will be appreciated that each of these holes 67 will continuously pass a small beam of light 68 on to recording medium 41 at selected horizontal locations as it moves past window 66. Each of these small beams 68 will, therefore, result in a longitudinal line such as lines 19, 20, 21 and 22 on recording medium 41.

Figure 7:
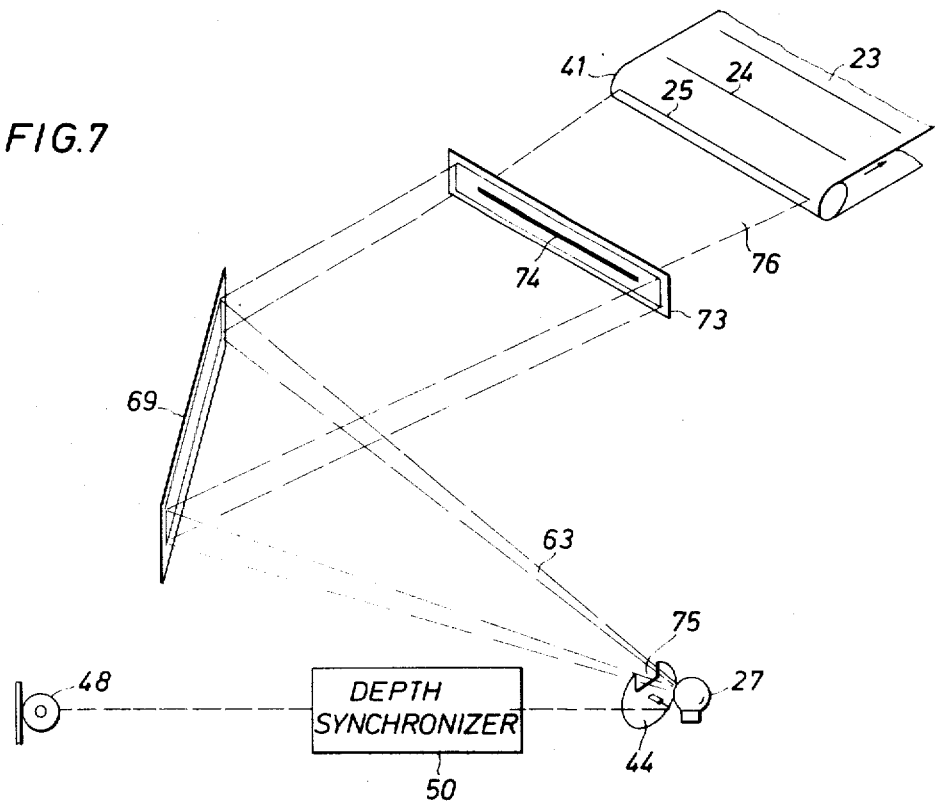
FIG. 7 is a diagrammatic illustration of apparatus of the present invention for producing horizontal or depth lines on a recording medium.

As shown in FIG. 3, light beam 63 provides depth lines which run horizontally on recording medium 41 by transmitting light beam 63 through shutter apparatus 44 and a series of mirrors 69 through 72, mask 73 (having a slit or aperture 74) on to recording medium 41. Referring now to FIG. 7, there is a diagrammatical representation comprised of light source 27, shutter apparatus 44, mirror 69 and mask 73 which illustrated how the horizontal or depth lines such as 23, 24, and 25 are produced on recording medium 41. As can be seen, shutter apparatus 44 is coupled to measuring wheel 48 such that aperture 75 passes light beam 63 on to mirror 69 only for an instant and only when a preselected increment of multiconductor cable 11 moves past the measuring wheel 48. Light beam 63 after passing shutter apparatus 44 and after being reflected by mirror 69 is passed through slit 74 of mask 73 such that it is in the form of a sheet of light 76 prior to impinging on recording medium 41. Thus, it will be appreciated that each momentary exposure of recording medium 41 to sheet of light 76 which sheet of light extends substantially across recorder medium 41 at horizontal axis 42 will result in a horizontal or depth line on the recording medium.

While there has been described what is, at present, considered to be a preferred embodiment of this invention, it will be obvious to those skilled in the art that various changes and modifications may be made therein without departing from the invention. In addition, whereas the recorder of the apparatus of this invention for producing vectors or arrows has been described in connection with well logging, it will be readily appreciated that such displays of vectors could be used for other purposes such as, for example, to represent the strength and direction of the wind. Therefore, this invention is intended to cover all such changes and modifications as fall within the true spirit and scope of the invention.

I claim:

1. Apparatus for recording well-logging data as distinctive indicia respectively representative of at least two selected parameters at various depths in a well bore and comprising:
   means adapted for providing first and second data respectively representative of successive determinations of two selected well-logging parameters derived upon movement of a well-logging tool through a well bore;
   a recording medium sensitive to energy of a predetermined character;
   means cooperatively arranged for selectively driving said recording mediun along a predetermined travel path as a function of the depth positions of a well-logging tool providing said successive determinations;
   means cooperatively arranged for providing an intermittent, selectively orientable and directable first beam of said energy having an identifiable transverse axis and adapted for successively placing selectively-positioned first distinctive indicia representative of said two welllogging parameters at selected first locations on said recording medium;
   control means responsive to said first data for successively orienting said selectively-orientable first beam to orient its said transverse axis in selected angular alignments which are functionally representative of one of said well-logging parameters and responsive to said second data for successively directing said selectively-orientable first beam toward corresponding ones of said first locations on said recording medium which are functionally representative of the other of said well-logging parameters; and
   means cooperatively arranged for sequentially producing an intermittent, fixed second beam of said energy for successively placing second distinctive indicia at selectively-spaced second locations on said recording medium which are functionally representative of the depth positions of a well-logging tool providing said successive determinations.

2. The apparatus of claim 1 further including:
   means cooperatively arranged for providing at least one stationary third beam of said energy directed at a selected third location on said recording medium for also placing corresponding third distinctive indicia on said recording medium which are functionally representative of at least one predetermined scale value of said other welllogging parameter.

3. The apparatus of claim 2 wherein said stationary third beam is uninterrupted during the movement of said recording medium so that said corresponding third distinctive indicia will be in the form of at least one unbroken scale line extending along at least a major portion of said recording medium as said recording medium is driven along said travel path.

4. The apparatus of claim 1 wherein said intermittent second beam is provided at predetermined regular intervals as a function of the movement of a well-logging tool providing said successive determinations for successively placing said second distinctive indicia at uniformly-spaced ones of said second locations which are representative of predetermined depth increments.

5. The apparatus of claim 1 wherein said intermittent second beam has a substantially-elongated major axis so that said second distinctive indicia will be in the form of elongated depth lines extending across at least a portion of said recording medium.

6. The apparatus of claim 1 further including:
   means cooperatively arranged for providing a plurality of stationary third beams of said energy directed at spaced third locations across said recording medium for also placing a corresponding number of third distinctive indicia spatially distributed across said recording medium and respectively respresentative of predetermined incremental scale values of said other well-logging parameter as said recording medium is advanced.

7. The apparatus of claim 6 wherein said stationary beams are uninterrupted during the movement of said recording medium so that said third distinctive indicia will respectively define unbroken scale lines spatially distributed across at least a major portion of said recording medium and generally parallel to said travel path.

8. Apparatus for recording well-logging data as distinctive indicia respectively representative of at least one selected angular measurement and another selected measurement taken at various depths in a well bore and comprising:
   means adapted for sequentially providing first and second data respectively representative of successive determinations of at least two selected well-logging parameters cooperatively derived upon movement of a well-logging tool through a well bore, with at least one of said well-logging parameters being an angular measurement;
   a recording medium sensitive to energy of a predetermined character and adapted for advancement along a predetermined longitudinally-directed axis;
   means cooperatively arranged for selectively driving said recording medium along said axis of advancement to proportionally represent the movement of a well-logging tool providing said successive determinations;
   means cooperatively arranged for sequentially providing an intermittent selectively-orientable and laterallydirectable first beam of said energy having a cross-sectional pattern with a directionally-indicative shape and adapted for successively placing selectively-positioned first distinctive indicia representative of said two well-logging parameters at selected first locations on said recording medium;
   first control means coupled to said beam-providing means and responsive to said first data for sequentially orienting said first beam to successively orient said beam pattern in angular alignments respectively corresponding to successive values of said one well-logging parameter;

second control means responsive to said second data for sequentially direction said first beam laterally toward selected ones of said first locations on said recording medium respectively corresponding to successive values of the other of said well-logging parameters; and depth-indicating means cooperatively arranged for sequentially producing an intermittent fixed second beam of said energy upon advancement of said recording medium for successively placing second distinctive indicia at selected longitudinally-spaced second locations on said recording medium respectively corresponding to predetermined incremental depth positions of a well-logging tool providing said successive determinations.

9. The apparatus of claim 8 wherein said depthindicating means are responsive to a function of the movement of a well-logging tool providing said successive determinations.

10. The apparatus of claim 8 wherein said other welllogging parameter is a function of the magnitude of inclination of a well bore in which a well-logging tool providing said successive determinations is moved, and said one well-logging parameter is a function of the azimuth of said well-bore inclination.

11. The apparatus of claim 8 wherein said other welllogging parameter is a function of the magnitude of inclination of an earth formation penetrated by a well bore in which a well-logging tool providing said successive determinations is moved, and said one well-logging parameter is a function of the azimuth of said formation inclination.

12. The apparatus of claim 8 wherein said second beam has a substantially-elongated laterally-directed major axis so that said second distinctive indicia will be in the form of elongated depth lines extending laterally across at least a major portion of said recording medium and generally perpendicular to said axis of travel.

13. The apparatus of claim 8 further including:
scale-indicating means cooperatively arranged for providing a plurality of stationary third beams of said energy directed at spaced third locations along a laterally-aligned axis for also placing a corresponding number of third distinctive indicia spatially distributed across at least a portion of said recording medium and respectively representative of predetermined progressively-increasing incremental scale values of said other well-logging parameter.

14. The apparatus of claim 13 wherein said third beams are uninterrupted during the advancement of said recording medium so that said third distinctive indicia will respectively be in the form of unbroken scale lines generally parallel to said axis of advancement.

15. The apparatus of claim 14 wherein said second beam has a substantially-elongated laterally-directed major axis so that said second distinctive indicia will be in the form of elongated depth lines extending across at least a major portion of said recording medium and at substantially right angles to said unbroken scale lines.

16. The apparatus of claim 15 wherein said depthindicating means are responsive to a function of the movement of a well-logging tool providing said successive determinations.

17. Apparatus adapted for recording well-logging data as distinctive indicia representative of the azimuth as well as the magnitude of the inclination of a selected well-logging parameter and comprising:
means for sequentially providing first and second data respectively representative of successive angular measurements of the azimuth and the inclination of a selected well-logging parameter derived upon movement of a well-logging tool through a well bore;

medium-driving means cooperatively arranged for selectively carrying a recording medium sensitive to said energy along a predetermined path of travel at a rate proportionally corresponding to the rate of movement of a well-logging tool obtaining said successive angular measurements;

first means including beam-forming means cooperatively arranged between said medium-driving means and said energy source and adapted for forming a selectively-orientable intermittent first beam of said energy into a predetermined beam pattern having a cross-section of an azimuthindicating shape to successively produce selectively-oriented first distinctive indicia representative of said successive azimuth measurements on a recording medium carried on said mediumdriving means, and first control means cooperatively coupled to said beam-forming means and adapted for sequentially operating said beam-forming means for selectively orienting said first beam in response to said first data to successively produce said first distinctive indicia;

second means including controllable beam-directing means cooperatively arranged between said medium-driving means and said energy source and adapted for selectively directing an intermittent second beam of said energy to successively produce second distinctive indicia representative of the magnitude of said successive inclination measurements on a recording medium carried on said medium-driving means, and second control means cooperatively coupled to said controllable beam-directing means and adapted for sequentially operating said controllable beam-directing means for selectively directing said second beam in response to said second data to successively produce said second distinctive indicia; and third means including fixed beam-directing means cooperatively arranged between said mediumdriving means and said energy source and adapted for selectively directing an intermittent third beam of said energy to successively produce third distinctive indicia on a recording medium carried on said medium-driving means corresponding to selected depth positions of a well-logging tool providing said successive measurements.

18. The apparatus of claim 17 further including fixed beam-directing means cooperatively arranged between said medium-driving means and said energy source and adapted for selectively directing a plurality of spaced fourth beams of said energy to successively produce corresponding numbers of fourth distinctive indicia respectively representative of predetermined incremental scale values of said second data on a recording medium carried on said medium-driving means.

19. Apparatus adapted for recording well-logging data as distinctive indicia representative of the azimuth as well as the magnitude of the inclination of a selected well-logging parameter and comprising:

means for sequentially providing first and second data respectively representative of successive angular measurements of the azimuth and the inclination of a selected well-logging parameter derived upon movement of a well-logging tool through a well bore;

a source of radiant energy;

an elongated recording medium sensitive to said energy;

means cooperatively arranged for selectively advancing said recording medium along its longitudinal axis as a function of the movement of a well-logging tool in a well bore obtaining said successive angular measurements;

first beam-forming means cooperatively arranged between said energy source and said recording medium and adapted for forming a first beam of said energy into a predetermined first beam pattern having a transverse cross-section with a nondirectional portion and an angularly-directional portion;

second beam-forming means cooperatively arranged between said energy source and said recording medium and adapted for forming a second beam of said energy into a predetermined second beam pattern;

beam-interrupting means cooperatively arranged between said energy source and said recording medium and adapted for sequentially interrupting said first and second energy beams as a function of the movement of a well logging tool in a well bore obtaining said successive angular measurements;

first beam-directing means cooperatively arranged between said energy source and said recording medium and adapted for movably directing said first energy beam at selected locations distributed laterally across at least a major portion of said recording medium;

control means coupled to said first beam-forming means and responsive to said first data for sequentially orienting said directional portion of said first beam pattern to corresponding angular positions representative of said successive azimuth measurements and coupled to said first beam-directing means for also sequentially directing said nondirectional portion of said first beam pattern toward corresponding ones of said selected locations for successively placing first distinctive indicia corresponding to said first beam pattern at longitudinally-spaced intervals on said recording medium as it is advanced to respectively depict sequential azimuths and inclinations of said well-logging parameter which are measured by a well-logging tool obtaining said successive angular measurements; and second beam-directing means cooperatively arranged between said energy source and said recording medium and adapted for fixedly directing said second energy beam at a selected location on said recording medium for successively placing second distinctive indicia corresponding to said second beam pattern at longitudinally-spaced intervals on said recording medium as it is advanced to respectively depict sequential depth positions of a well-logging tool obtaining said successive angular measurements.

20. The apparatus of claim 19 wherein said sequential depth positions are at predetermined increments of depth.

21. The apparatus of claim 19 further including:

third beam-forming means cooperatively arranged between said energy source and said recording medium and adapted for forming a plurality of third beams of said energy; and third beam-directing means cooperatively arranged between said energy source and said recording medium and adapted for fixedly directing said third energy beams at a corresponding number of laterally-spaced locations on said recording medium for successively placing spatially-distributed third distinctive indicia on said recording medium as it is advanced which are respectively representative of predetermined incremental scale values of said inclination measurements.

22. The apparatus of claim 2 wherein said third energy beams are uninterrupted during advancement of said recording medium so that said third distinctive indicia will respectively be in the form of unbroken longitudinally-directed scale lines on said recording medium.

23. The apparatus of claim 19 wherein said second beam pattern has a substantially-elongated laterally-directed major axis so that said second distinctive indicia will be in the form of longitudinally-spaced, elongated depth lines extending laterally across at least a major portion of said recording medium and generally perpendicular to said longitudinal axis.

24. The apparatus of claim 23 further including:

third beam-forming means cooperatively arranged between said energy source and said recording medium and adapted for forming a plurality of third beams of said energy; and third beam-directing means cooperatively arranged between said energy source and said recording medium and adapted for fixedly directing said third energy beams at a corresponding number of laterally-spaced locations on said recording medium for successively placing spatiallydistributed third distinctive indicia on said recording medium as it is advanced which are respectively representative of predetermined incremental scale values of said inclination measurements.

25. The apparatus of claim 24 wherein said third energy beams are uninterrupted during advancement of said recording medium so that said third distinctive indicia will respectively be in the form of unbroken longitudinally-directed scale lines on said recording medium which are substantially perpendicular to said depth lines.

26. The apparatus of claim 19 wherein said welllogging parameter is the axial direction at various depth intervals of a well bore in which a well-logging tool providing said successive angular measurements is moved so that the respective lateral positions of said nondirectional portions of said first distinctive indicia on said recording medium will be respectively indicative of the magnitude of the measured well-bore inclinations and the respective angular positions of said directional portions of said first distinctive indicia on said recording medium will be respectively indicative of the corresponding measured azimuths of said well-bore inclinations.

27. The apparatus of claim 19 wherein said well-logging parameter is the planar direction of earth formations penetrated at various depth intervals by a well bore in which a well-logging tool providing said successive angular measurements is moved so that the respective lateral positions of said non-directional portions of said first distinctive indicia on said recording medium will be respectively indicative of the magnitude of the measured formation inclinations and the respective angular positions of said directional portions of said first distinctive indicia on said recording medium will be respectively indicative of the corresponding measured azimuths of said formation inclinations.

* * * * *